US007962173B2

(12) United States Patent
Oshima et al.

(10) Patent No.: US 7,962,173 B2
(45) Date of Patent: Jun. 14, 2011

(54) PORTABLE PERSONAL SERVER DEVICE WITH BIOMETRIC USER AUTHENTICATION

(75) Inventors: Shunichi Oshima, Kowloon (HK); Hikaru Saito, Bunkyo-ku (JP); Shogo Nakazato, Arakawa-ku (JP); Tomoaki Narahara, Suginami-ku (JP); Haruhiro Kikkawa, Setagaya-ku (JP); Yukimasa Katsuhara, Tachikawa (JP); Takeshi Ogi, Setagaya-ku (JP)

(73) Assignee: Para3, Inc., Seattle, WA (US)

( * ) Notice: Subject to any disclaimer, the term of this patent is extended or adjusted under 35 U.S.C. 154(b) by 819 days.

(21) Appl. No.: 10/584,118

(22) PCT Filed: Dec. 25, 2003

(86) PCT No.: PCT/JP03/16815
§ 371 (c)(1),
(2), (4) Date: Apr. 27, 2007

(87) PCT Pub. No.: WO2005/064485
PCT Pub. Date: Jul. 14, 2005

(65) Prior Publication Data
US 2007/0275754 A1    Nov. 29, 2007

(51) Int. Cl.
*H04W 4/00* (2009.01)
(52) U.S. Cl. .............. 455/556.2; 455/556.1; 455/3.05; 455/414.1; 709/203; 709/222; 709/223; 361/679.23; 380/278; 380/30
(58) Field of Classification Search .............. 455/556.2, 455/556.1, 3.05, 414.1; 380/28, 278, 30; 726/5; 709/222, 223, 203; 361/679.23
See application file for complete search history.

(56) References Cited

U.S. PATENT DOCUMENTS

| 6,038,666 | A | 3/2000 | Hsu | |
|---|---|---|---|---|
| 2002/0186838 | A1* | 12/2002 | Brandys | 380/30 |
| 2003/0005336 | A1* | 1/2003 | Poo et al. | 713/202 |
| 2003/0084056 | A1* | 5/2003 | DeAnna et al. | 707/100 |
| 2003/0157959 | A1* | 8/2003 | Makela et al. | 455/556 |
| 2003/0214779 | A1* | 11/2003 | Socolofsky | 361/683 |

FOREIGN PATENT DOCUMENTS

| JP | 10260749 A | 9/1998 |
|---|---|---|
| JP | 11316818 A | 11/1999 |
| JP | 2001-92668 A | 4/2001 |
| JP | 2001-358828 A | 12/2001 |
| JP | 2002-123437 A | 4/2002 |
| WO | 00/42491 A1 | 7/2000 |
| WO | 03/003283 A1 | 1/2003 |

OTHER PUBLICATIONS

Translation of Notice of Reasons for Rejection mailed Jan. 19, 2010, in related Japanese Application No. 2005-512800, filed Dec. 25, 2003.
Translation of Notification of Second Office Action mailed Sep. 18, 2009, in related Chinese Application No. CN 2003801110174, filed Dec. 25, 2003.

* cited by examiner

*Primary Examiner* — Pierre-Louis Desir
(74) *Attorney, Agent, or Firm* — Christensen O'Connor Johnson Kindness PLLC

(57) ABSTRACT

A portable personal server connectable through a network with a PC connected with an external network that permits communication with the PC only when user's fingerprint information read out by means of a fingerprint authentication unit matches registered information. In order to communicate through the network, the portable personal server and the PC acquires an address, preferably using APIPA, so that the collision of address does not take place in the external network. Consequently, the portable personal server also functions as a network server on the external network. A portable personal server exhibiting high confidentiality of data and suitable for central management of data can thereby be realized.

6 Claims, 4 Drawing Sheets

PORTABLE PERSONAL SERVER DEVICE WITH BIOMETRIC USER AUTHENTICATION

BACKGROUND

The information that is necessary for business and daily life is stored as electronic data in the internal storage device of a personal computer (PC), a server system connected to a network, or in an external memory device connected to a PC, etc. PCs are widely and generally used for accessing this data and processing data.

In recent years, the spread of the Internet has made it possible to access needed data via a network from PCs located anywhere. Therefore, when data becomes needed, a user can connect to a network utilizing a nearby PC and access the needed data. As a result, it commonly occurs that a single user uses two or three PCs: a PC located in the office, a portable PC used when out of the office on a business trip, etc., a PC located in the home, etc. Meanwhile, it is also the case that a PC located in an office or home is shared by a plurality of users.

Also, the need to have access to information at all times has increased, so data is also being copied to information processing terminals such as PDAs and portable telephones and constantly carried around. Storage devices such as USB tokens, media cards, etc. are used as means for simply making data constantly portable.

The unrestricted copying of data to PCs and information processing terminals is directly connected to information leaking. Therefore, terminal access control technology using passwords or biometric information is used as a means for identifying the right of access to data.

One proposal for a PC with this sort of terminal access control technology is a microcomputer with a fingerprint authentication card inserted in a PC slot; it is then used as one's own PC. (For example, see Patent Document 1.) Another proposal is a PDA with a built-in a fingerprint sensor, thus providing individual recognition and security functions. (For example, see Patent Document 2.)

Patent Document 1: Japanese Laid-open Patent Application 272349/1999

Patent Document 2: U.S. Pat. No. 6,016,476

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention pertains to a portable personal server device that has a biometric information recognition device with a server function so it can perform processing such as exchanging data, etc. with a network to which it is connected by a communication terminal's network connection means, by communicating with a communication terminal that has a network connection means.

When a single user utilizes multiple PCs to access data via a network, it frequently occurs that the accessed data is distributed to and stored in multiple PCs. Also, if the user processes the data, the data before processing and the data after processing are distributed on different PCs and saved there, and information consistency cannot be maintained.

Therefore, if data is unitarily collected and stored or processed on a server connected to a network, the consistency of information can be maintained with relative ease. In this case, users themselves cannot easily manage a server, so a server managed by someone else is relied upon for the relevant server abilities and administration, and data is temporarily put there with payment of something of value.

However, it is an uneasy feeling to be physically separated from personal data that only the user should access, and to entrust it to a server that is not under one's own control. It is also costly. Also, a server connected to a network is usually shared by many users. Therefore, regardless of what safety measures are taken, inevitably there is a high risk of information leaking to another person who can access the server. Also, when accessing the network is not possible, the relevant server cannot be accessed and it is impossible to obtain the needed data when it is needed.

Also, when multiple users share a PC, users store data on the same physical memory device, so there is a high risk of information leaking to other users sharing the PC.

When data is carried around on an information processing terminal the operability of the information processing terminal is generally worse than that of a PC, and compatibility too is low, so usually a PC is used as the main terminal and the information processing terminal is used as an auxiliary terminal. As a result, the user is bothered by having to convert data formats between the PC that is the main terminal and the information processing terminal and having to maintain data consistency and so forth.

When data is carried around on a portable memory medium such as a storage device, a network-connected server or other network device cannot communicate directly with the storage device. Therefore the user must do the bothersome operation of moving data stored in the storage device to a PC temporarily, and then sending the data from the PC to the network. As a result, if a copy of the data remains in the PC, there is a risk of information leaking.

On the other hand, if a PC is used as one's own PC by means of an authentication device, the authentication device is used to simply pass authentication information to the PC and start a specified service on the PC. Also, the services supplied from these authentication devices are usually fixed, and they bear a dedicated CPU, so they can be updated. However, in this case too only a very limited service description area of only a few 100 Kbytes or so can be provided. Also, currently these have to be programmed using a manufacturer-specific API, so the services provided by these authentication devices are essentially limited to the services provided by the manufacturer, and expandability is meager.

Next, when a company's confidential data, etc., is exchanged between the company and employees, the company's system administrator can manage the movement and processing of data within the company's own network according to the relevant administrator's policies. However, once data has moved outside the company's own network, it is difficult to thoroughly enforce management policies. For example, it is difficult to apply in-house management policies to information that an employee accesses and obtains using a PC located at home; the company must rely on the employee's common sense.

The issue addressed by the present invention is, in light of these points, to provide a portable personal server device with a server function capable of processing data between it and a network connected using a communication terminal's network connection means; it does so by communicating with a communication terminal that has a network connection means in order to unitarily manage data.

In order to solve these problems, the portable personal server device of the present invention comprises a local server for processing data between itself and a communication terminal that has a network connection means; a network server for processing data between itself and a network connected to the communication terminal by the communication terminal's network connection function; an individual authenticator for authenticating an individual based on biometric information; and a control that makes the local server and the network server useable only when authenticated by the individual authenticator.

The portable personal server device of the present invention has a local server means that processes data between itself and a communication terminal equipped with a network connector. That is, it functions as a local server by communicating with a communication terminal (such as a PC, etc.) equipped with a network connector, so it is possible to access data stored in the portable personal server device using a PC installed at any location. In addition, even if data is processed by a PC, the processed data is always stored on the portable personal server device and the data can be updated to the latest data. As a result, data is not distributed across multiple PCs and data consistency is maintained. Also, it is not necessary to pay attention to the format of the data. Also, data is not distributed across multiple PCs, so it is possible to manage data according to a company's management policies by thoroughly enforcing management of the portable personal server device.

Also, the portable personal server device of the present invention has a network server for processing data between itself and a network connected to the communication terminal. Therefore it is possible to send information from the portable personal server device to the network, to receive data from the network, to perform automatic processing, and to return the processing result to the indicated communication terminal device. Also, the portable personal server device is connected to the network via the communication terminal, but the portable personal server device itself has a network server function, so data is not saved in the communication terminal, even temporarily. Therefore there is absolutely no leakage of information from data saved in the communication terminal.

In addition, the portable personal server device has an individual authentication means that authenticates an individual based on biometric information such as a fingerprint, etc., and a control means that makes the local server means and the network server useable only when authenticated by the individual authenticator. Therefore data stored in the portable personal server device cannot be accessed by someone other than its owner. Therefore, even if the portable personal server device is lost, leakage of data to another person can be avoided. In particular, it is possible to constitute a portable personal server device so it does not have all of the operational input/output devices (e.g., a keyboard, display, etc.). If this is done, even if the portable personal server device is lost, it is difficult for another person to access the internal data, resulting in high confidentiality.

Also, after the owner of the portable personal server device is identified by the individual authenticator, the portable personal server device is caused to function as a network server by a network authenticator that utilizes a special digital certificate, etc. As a result, another person who tries to access a portable personal server device that is functioning as a network server from the network can confirm that the relevant portable personal server device is not the wrong one and the portable personal server device is the owner's. Also, the other person using the network can confirm that the actual owner of the relevant portable personal server device is using it, so it is possible to reduce the risk of accessing a network server operated by a malicious person. In addition, in the event that a problem occurs while accessing a portable personal server device, it is possible to determine that the cause of the problem was caused by the relevant portable personal server device and its owner, whereby the reliability of the communication system is ensured.

The individual authenticator is equipped with a biometric information recognition device such as a fingerprint sensor, etc., and can be constituted so that it authenticates an individual according to whether or not biometric information read by the biometric information recognition device matches registered biometric information that was previously registered.

The portable personal server device preferably has a data encryptor for encrypting stored data using the read biometric information. Data stored in the portable personal server device is encrypted based on the owner's biometric information, so even if someone disassembles the portable personal server device and attempts to access the data within, it is difficult for another person to decode the stored data. As a result, leakage of data to another person can be avoided.

In addition, the portable personal server device preferably has a communication encryptor that, when the read biometric information matches the registered biometric information, generates and retains a key used in a public key encryption system based on the read biometric information, and encrypts the data to be sent using the key. The communication encryptor protects data that is being sent and received via a network, whereby the security of the communication system is ensured.

In addition, the portable personal server device preferably has a communication cable terminal for connection to the communication terminal. Power from the communication terminal is received via the communication cable terminal. Power is supplied from the communication terminal, which is a PC or the like, so the portable personal server device does not need to have its own power source. As a result, the portable personal server device is small and can be manufactured cheaply, so it is convenient for individual users to carry around constantly. Neither does it need to be charged. In addition, the portable personal server device and the communication terminal become able to communicate by connecting a physical means, so the risk of interception of communication between the portable personal server device and the communication terminal is low.

In this case, a USB connection terminal is preferred as the communication cable terminal.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
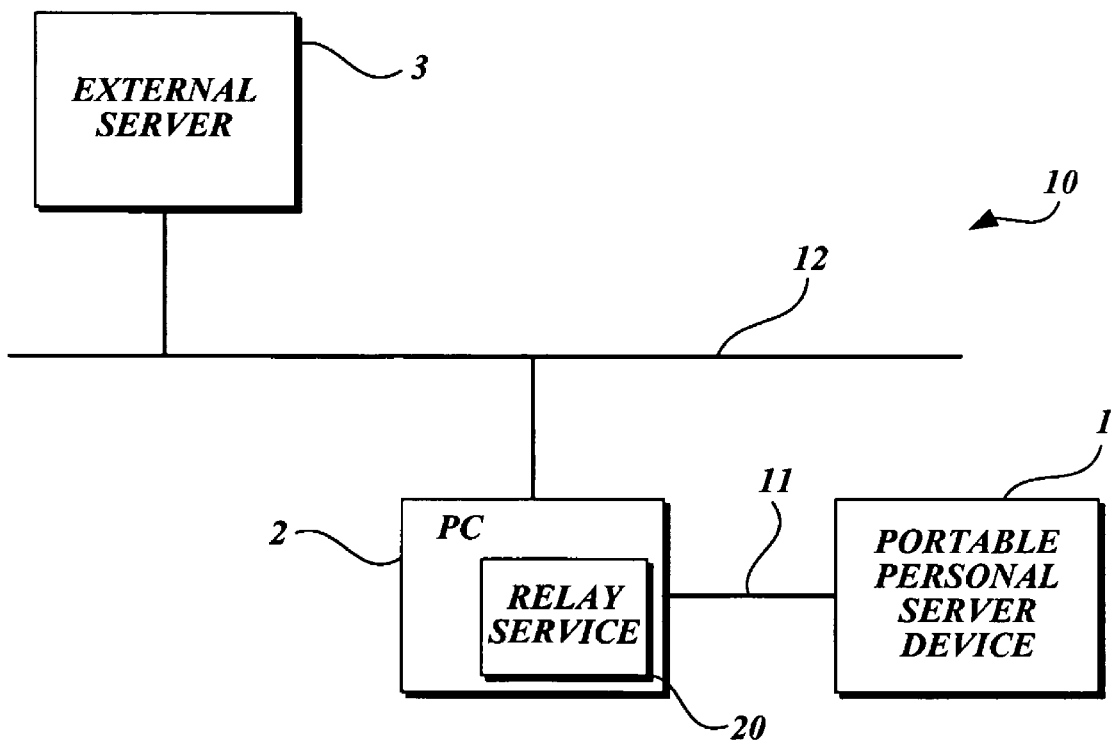
FIG. 1 is a block diagram showing the structure of one example of a communication system structured using the portable personal server device of the present invention.

FIG. 1 is a block diagram showing the structure of one example of a communication system employing the present invention. As shown in FIG. 1, this embodiment's communication system 10 comprises a portable personal server device 1 and a PC 2 that has a network connection means. The portable personal server device 1 and PC 2 are connected by a network 11 so that they can communicate. The PC 2 is connected to an external network 12 such as the Internet, etc. Preferably, the network 11 and external network 12 are both IEEE802 networks with TCP/IP connection. An external server 3 is connected to the external network 12.

Figure 2:
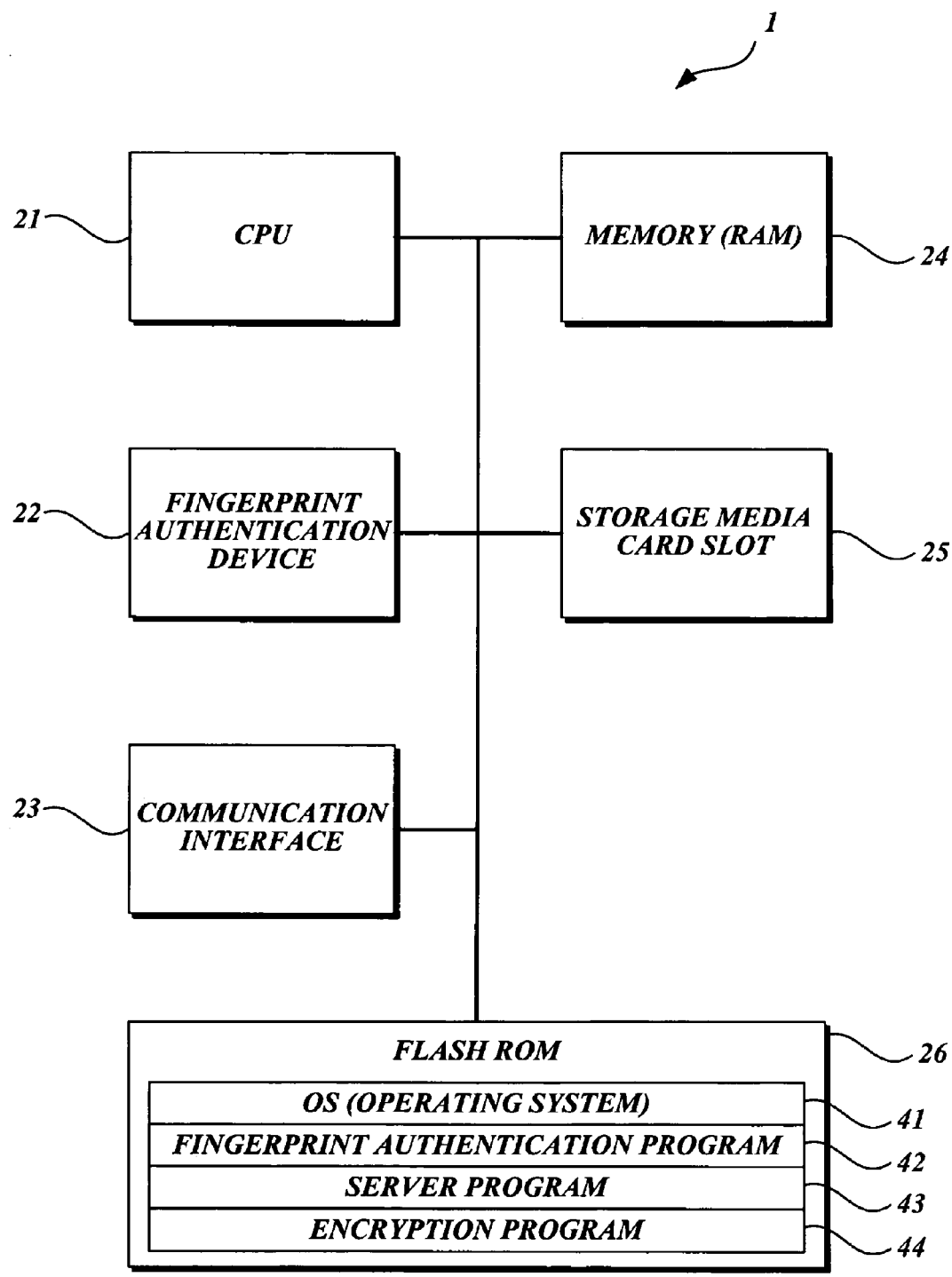
FIG. 2 is a block diagram showing the structure of the portable personal server device of FIG. 1.

FIG. 2 is a block diagram showing the structure of the portable personal server device. The portable personal server device 1 comprises a CPU 21, a fingerprint authentication device 22, a communication interface 23, a memory (RAM) 24, a storage media card slot 25, and a flash ROM 26. Stored in the flash ROM 26 are an operating system (OS) 41, a fingerprint authentication program 42, a server program 43, and an encryption program 44.

Figure 3:
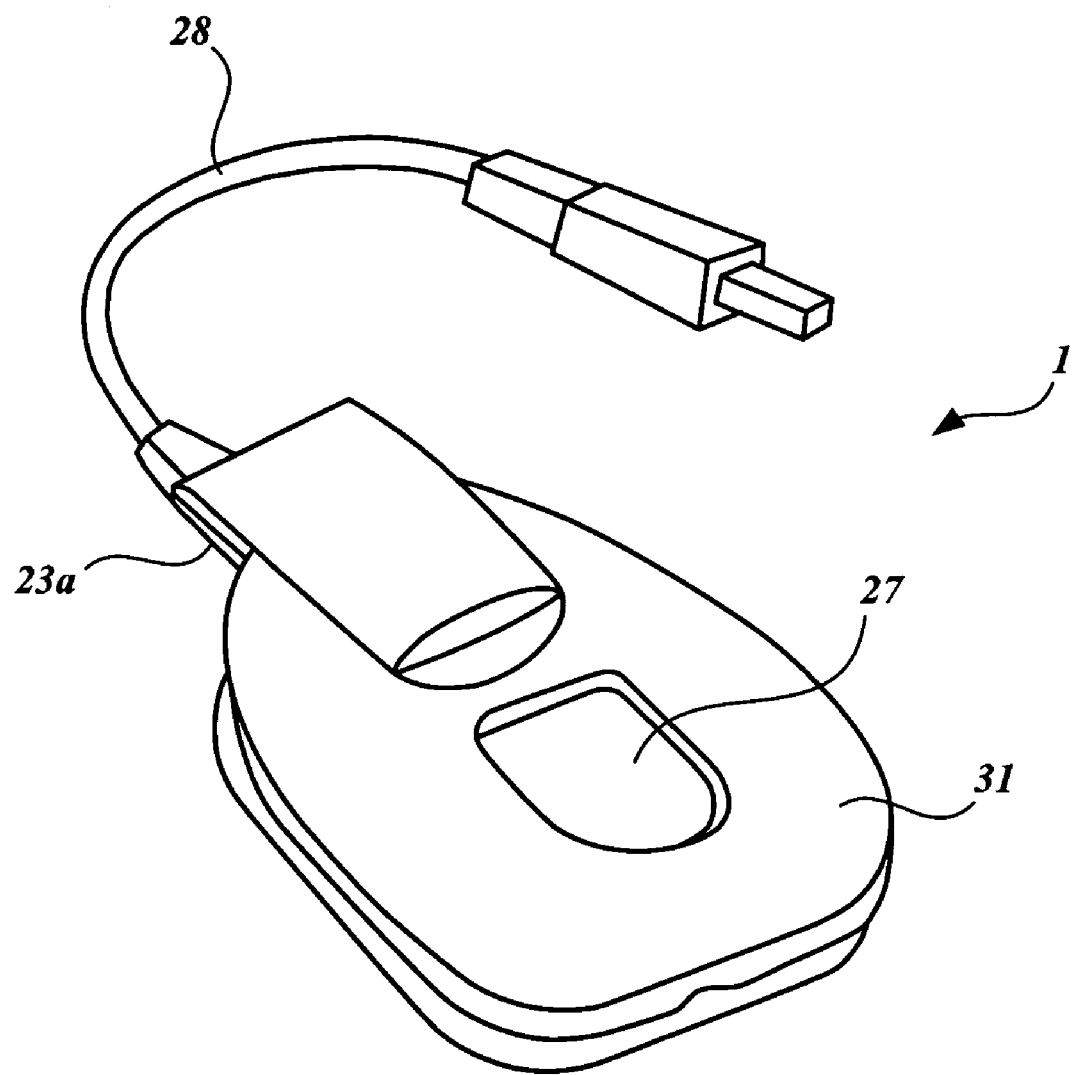
FIG. 3 is an external oblique view of the portable personal server device of FIG. 1.

FIG. 3 is an external oblique view of the portable personal server device. The portable personal server device 1 comprises a device body 31, preferably with an egg-shaped contour shape whose size is as large as the palm of a hand. A fingerprint sensor portion 27 of the fingerprint authentication device 22 is disposed in the center of the surface of the device body 31. The communication interface 23's connection terminal 23*a* is disposed at the end of the device body 31. The communication interface 23 is a USB communication interface; connected to the connection terminal 23*a* is a USB cable 28 connected to the network 11.

The communication interface 23 supplies the function of allowing the personal server device 1 and PC 2 to communicate via the network 11, and the function of allowing the personal server device 1 to communicate with the external network 12 via the PC 2. The fingerprint authentication device 22 and fingerprint authentication program 42 provide the individual authentication means. That is, the fingerprint authentication device 22 reads the user's fingerprint information detected by the fingerprint sensor portion 27, and the fingerprint authentication program 42 compares the read fingerprint information to the previously registered fingerprint information. If the fingerprint information matches, this authenticates that the user is the previously registered user and the real person.

The server program 43 provides the local server function of processing data between itself and the PC 2, and the network server function of processing data between itself and the external network 12. The encryption program 44 provides a data encryption means that encrypts data stored in the personal server device 1 based on fingerprint information.

Figure 4:
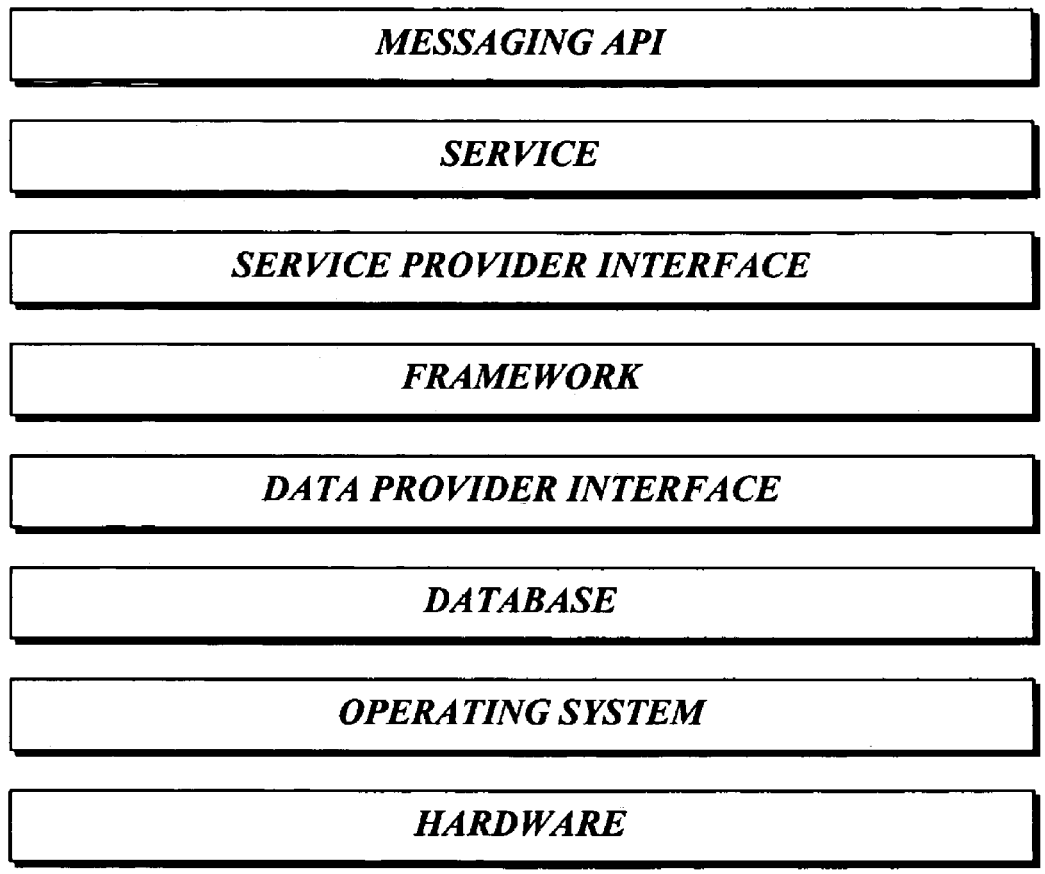
FIG. 4 is a conceptual diagram representing the software structure of the portable personal server device of FIG. 1.

FIG. 4 is a conceptual diagram representing the software structure of the personal server device. The hardware constitutes, from the bottom layer, the OS, database, data provider interface, framework, service provider interface, service, and messaging API.

The portable personal server device 1 receives power from the PC side and starts when it is connected to the PC 2 by the communication interface 23. The user touches a fingertip to the fingerprint sensor portion 27 of the fingerprint authentication device 22, and receives individual authentication using fingerprint information. If the read fingerprint information obtained by the fingerprint authentication device 22 matches the registered fingerprint information previously registered in the personal server device 1, the portable personal server device 1 becomes able to communicate with the PC 2 via the network 11.

The portable personal server device 1 and PC 2 obtain an address, preferably using APIPA, in order to be able to communicate via the network 11. When doing so, addressing is performed cooperatively in order to avoid conflict with the address of the external network 12 connected to the PC 2. After addressing, the PC 2 finds the personal server device 1 by performing discovery using a relay service 20 installed in a computing device, such as a Windows™ PC. A protocol called SOAP (Simple Object Access Protocol) that includes discovery is preferably used in communication between the portable personal server device and PC 2. SOAP uses XML syntax.

When the PC discovers the portable personal server device 1, the external network 12 and the portable personal server device 1 become able to communicate. In addition, the portable personal server device 1 also connects to the external network 12 using a special digital certificate. If a connection is established between the external network 12 and portable personal server device 1 as a result of this operation, the portable personal server device 1 functions as a network server on the external network 12. Using a network authentication means, another person or an external server 3 that is attempting to access the portable personal server device 1, which is functioning as a network server, can confirm from the external network 12 that the portable personal server device 1 is not the wrong one and that the portable personal server device 1 is the previously registered user's.

Here the PC 2's relay service 20 relays messages, SOAP messages in the exemplary embodiment described herein, from an application on the PC 2 to the portable personal server device 1, from the portable personal server device 1 to an application on the PC 2, from the portable personal server device 1 to the external server 3, etc. Also, the portable personal server device 1 generates and retains the key used in the public key encryption system based on the fingerprint information obtained by the fingerprint authentication device 22. Also, when necessary it generates a shared key and provides a communication encryption function that uses both the shared key and public key.

A user who carries around the portable personal server device 1 can always store data and applications in the portable personal server device 1. Therefore data can be unitarily managed, and a specific application can be used from multiple PCs without being installed on the PC itself.

Also, the portable personal server device 1 has an individual authentication means that uses fingerprint information, so someone other than the registered owner cannot connect to the PC 2 and operate it as a local server or network server. In addition, the portable personal server device 1 does not have an intrinsic input/output device, so it is difficult for someone other than the actual owner to access the stored data and there is no risk of information leaking. Also, another person who is attempting to access the portable personal server device 1, which is functioning as a network server, from the external network 12 can determine that the relevant portable personal server device 1 is not the wrong one and the portable personal server device 1 is the previously registered user's, so reliability of the communication system 10 is high.

In addition, the portable personal server device 1 is connected to the PC 2 and the external network 12 in the communication system 10 by TCP/IP and functions as a local server and network server. Therefore it is possible to provide a user interface that can be interactive using an ordinary Internet browser. Also, data and messages can be passed to the external server 3 connected to the external network 12, and a program at the external server 3 can be directly utilized.

In addition, the connection between the portable personal server device 1 and the external network 12 uses the relay service 20 installed in the PC 2, so data is not retained in the PC 2, even temporarily. Therefore there is no risk of information leaking from the PC 2.

Next, the portable personal server device 1, unlike the typical device or storage device for authentication, has a hardware constitution like that of the typical server hardware, consisting of a CPU 21, flash ROM 26, RAM 24, etc. Therefore it can employ the same constitution as a standard application server as an internal software constitution. It also has a dedicated CPU 21, so it is possible to construct a communication system that provides services within the portable personal server device 1, processes external calculation requests, and automatically outputs the calculation processing result without placing a load on the PC 2.

Also, when providing services within the portable personal server device 1, it is possible to provide them as an API based on the standard Web Services specification defined in W3C, for example, and to not use a specialized API, so service developers do not need to learn a new programming language, and it is easy to develop an application that uses the services provided by the portable personal server device 1 or to expand the functions of the service itself, etc.

In addition, the portable personal server device 1 has a dedicated database corresponding to XML/SOAP in the herein-described exemplary embodiment, so it can be used as an ordinary data communication system. Also, the compatibility of developed applications is high. Also, the portable personal server device 1 is provided with a storage media card slot 25, so if necessary it is possible to supply a storage space of theoretically unlimited size by switching media cards. In this case too the encryption program 44 encrypts the stored data in the media card based on fingerprint information, so data confidentiality is high.

In addition, USB is used as the communication interface 23 connecting the portable personal server device 1 and the PC 2, so power can be supplied to the portable personal server device 1 from the PC 2. Therefore it does not need its own power source and the device can be miniaturized. Also, recharging, etc., is not necessary, which is convenient for portability.

The portable personal server device 1 described above uses a USB for connection with the PC 2. Alternatively to a wired connection, the physical connection with the PC may be wireless. For example, Ethernet, Bluetooth, WLAN, infrared, etc., can be utilized. In any case, all of the data is encrypted using, for example, SSL communication or the like. As a result, the security of communication is ensured.

As will be appreciated from the foregoing description, a user can carry around a portable personal server device, so data and applications can always be managed unitarily. The portable personal server functions as a local server and network server by communicating with a communication terminal equipped with a network communication means, such as a PC, etc., so data and applications stored in the portable personal server device can be accessed using a PC installed at any location. In addition, the portable personal server is equipped with an individual authentication means that uses biometric information such as a fingerprint sensor, etc., so someone other than the owner cannot make the portable personal server device function as a server device. Therefore, even if the portable personal server device is lost, another person cannot access its stored data. As a result, data leaking is avoided. Also, another person attempting to access the portable personal server device from the network can know that the portable personal server device that is functioning as a network server always belongs to the actual owner. As a result, communication reliability is ensured.

Therefore, using the inventive portable personal server device makes it possible to construct a communication system with high reliability when utilizing network applications, etc., that use distributed network servers.

While illustrative embodiments have been illustrated and described, it will be appreciated that various changes can be made therein without departing from the spirit and scope of the invention.

What is claimed is:

1. A portable personal server device suitable for functioning as a server when connected to an external network, the portable personal server device comprising:
   a local server for processing data between the portable personal server device and a communication terminal equipped with a local network connector suitable for connection to the portable personal server device:
   a network server for processing data between the portable personal server device and an external device through an external network connected to the communication terminal by said communication terminal's local network connector;
   memory for storing an operating system for controlling the data processing operations of the local server and the network server, the memory also storing application services executable by the portable personal server device, the memory also storing user specific data, the operating system loading the application services into other memory locations on demand during execution;
   a messaging API for (i) allowing the communication terminal and other devices networked to the communication terminal to discover and use the application services and access the user specific data stored in memory as if the application services and data were stored in the communications terminal or another device networked to the communication terminal and (ii) facilitating secure communication between the communication terminal and the portable personal server device and between the portable personal server device and other devices networked to the communication terminal;
   an individual authenticator for authenticating an individual based on biometric information: and
   a control that makes said local server and said network server useable only when an individual is authenticated by said individual authenticator.

2. A portable personal server device according to claim 1, wherein said individual authenticator is equipped with a biometric information recognition device and authenticates an individual according to whether or not biometric information read by the biometric information recognition device matches registered biometric information that was previously registered.

3. A portable personal server device according to claim 2, further comprising a data encryptor for encrypting stored data using said read biometric information.

4. A portable personal server device according to claim 2, further comprising a communication encryptor that, when said read biometric information matches said registered biometric information, generates and retains a key used in a public key encryption system based on said read biometric information, and encrypts the data to be sent by the portable personal server device using the key after an individual is authenticated.

5. A portable personal server device according to any of claims 1 through 4, further comprising a communication cable for connecting to said communication terminal and receiving power from said communication terminal via said communication cable.

6. A portable personal server device according to claim 5, wherein said communication cable is USB.

* * * * *